Figure 1:
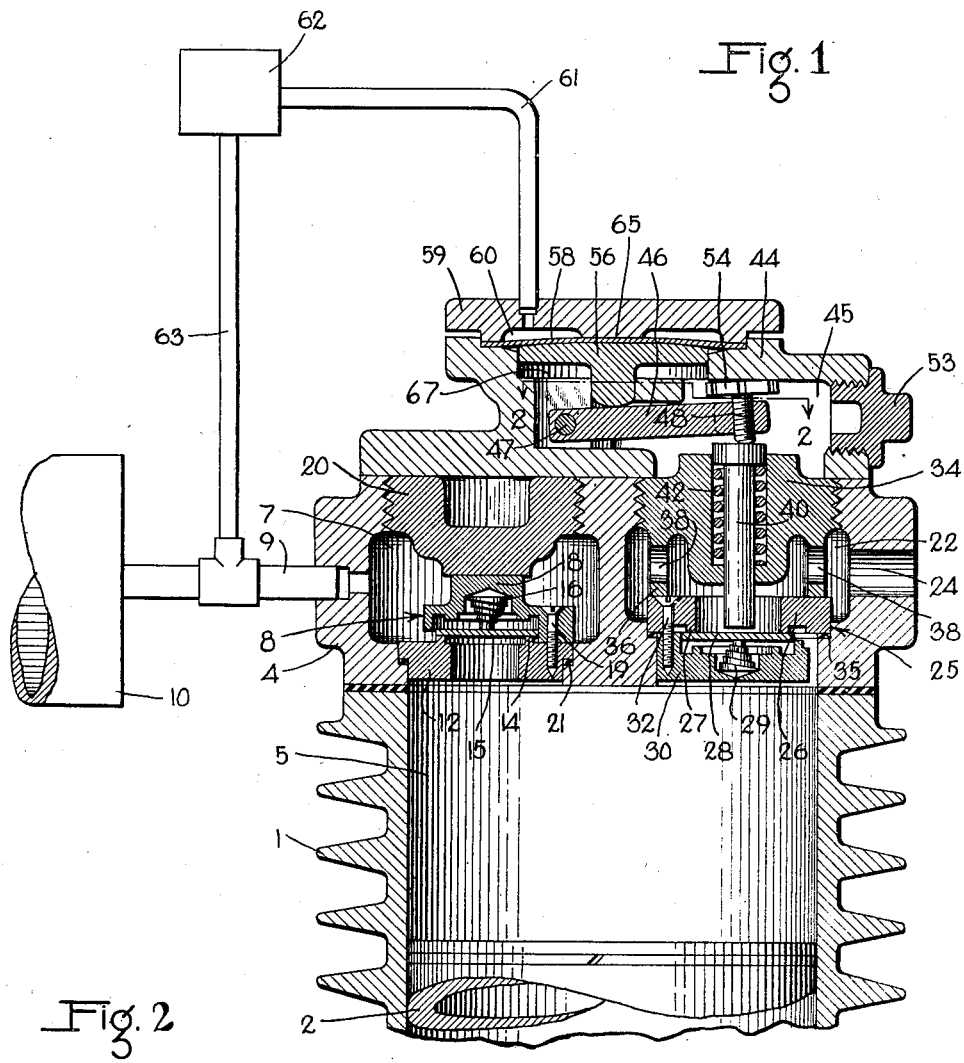

April 18, 1939.　　　　G. K. NEWELL　　　　2,155,236

COMPRESSOR UNLOADING DEVICE

Filed Sept. 14, 1937

INVENTOR
GEORGE K. NEWELL
BY
Wm. A. Cady
ATTORNEY

Patented Apr. 18, 1939

2,155,236

UNITED STATES PATENT OFFICE 2,155,236

COMPRESSOR UNLOADING DEVICE

George K. Newell, Pitcairn, Pa., assignor to The Westinghouse Air Brake Company, Wilmerding, Pa., a corporation of Pennsylvania Application September 14, 1937, Serial No. 163,802

1 Claim. (Cl. 230—24)

This invention relates to a fluid compressor and particularly to improved diaphragm actuated unloading means for a compressor.

A common type of fluid compressor comprises a body having a bore therein in which is reciprocable a piston having a compression chamber at the face thereof, while an inlet valve is provided to permit the flow of fluid to the compression chamber and to normally prevent flow of fluid from the compression chamber. When it is desired to unload the compressor, the inlet valve is held open to permit free flow of fluid under pressure to and from the compression chamber.

Various means are employed to hold the inlet valve open and a common form of construction includes a piston mounted in a bore and operated on the supply of fluid under pressure to the chamber at the face thereof to hold the inlet valve away from its seat. When a piston is employed fluid under pressure will leak past the piston, even though the various parts of the apparatus are constructed with a high degree of accuracy. This results in a loss of fluid under pressure which is objectionable, particularly where the compressor is operated in the unloaded condition for relatively long periods of time.

Accordingly it has been proposed to employ a diaphragm instead of a piston in the compressor unloading means to eliminate the leakage of fluid under pressure through the unloading means. A fluid compressor becomes relatively hot during operation with the result that a diaphragm constructed of composition, such as molded rubber reinforced with fabric, cannot be employed as it will not withstand the temperatures present in the compressor. It is necessary, therefore, to employ metal diaphragms, but these diaphragms, if of a practicable diameter, do not have sufficient flexibility or travel to enable the inlet valves to be moved far enough away from their seats to properly unload the compressor.

It is an object of this invention to provide improved diaphragm operated unloading means for a compressor, the unloading means incorporating means to multiply or amplify the movement of the diaphragm employed therein.

Another object of the invention is to provide improved diaphragm actuated unloading means for a compressor, the unloading means being entirely enclosed and protected.

A further object of the invention is to provide compressor unloading means of the type described and incorporating adjustable means to permit the member for unseating the compressor inlet valve to be adjusted relative to the inlet valve after the unloading means is assembled.

A further object of the invention is to provide an improved form of diaphragm actuated compressor unloading means which is arranged so that the flexible diaphragm employed therein can be easily replaced when necessary.

Another object of the invention is to provide improved unloading means for a fluid compressor.

A further object of the invention is to provide an improved fluid compressor construction.

Figure 2:
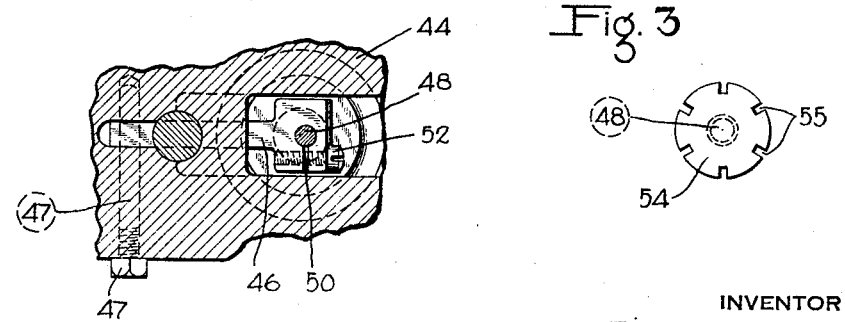
Figure 3:
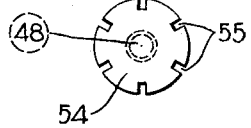

Other objects of the invention and features of novelty will be apparent from the following description taken in connection with the accompanying drawing, in which Fig. 1 is a fragmentary sectional view of a compressor equipped with one embodiment of the unloading means provided by this invention, Fig. 2 is a sectional view taken substantially along the line 2—2 of Fig. 1, and Fig. 3 is an elevational view of the head of the adjusting screw employed in the structure shown in Figs. 1 and 2.

Referring to the drawing, the compressor shown therein comprises a cylinder body 1 having a bore in which is mounted a piston 2. One end of the bore in the cylinder body 1 is closed by a cylinder head 4, thereby forming a compression chamber 5 at the face of the piston 2. The head 4 has formed therein an exhaust chamber 7 in which is mounted an exhaust valve assembly 8, while the exhaust chamber 7 is connected by way of a pipe 9 with a reservoir 10.

The exhaust valve assembly 8 comprises a seat element 12 having an opening therein surrounded by an annular seat rib 14, which is engaged by a disc valve 15 to permit fluid to flow from the compression chamber 5 to the exhaust chamber 7 and to prevent back flow of fluid from the exhaust chamber 7 to the compression chamber 5. The disc valve 15 is yieldingly pressed to the seated position by means of a spring 16 which extends between the disc valve 15 and a spring cage 18, which is secured to the seat element 12 by means of screws 19, one of which is shown in the drawing.

A threaded member 20 is secured in a threaded opening in the cylinder head 4 and exerts force on the spring cage 18 to press the seat element 12 against a shoulder 21 on the head 4 to maintain the exhaust valve assembly 8 in position in the exhaust chamber 7.

The cylinder head 4 also has formed therein an inlet chamber 22 which is open to the atmosphere through a passage 24, and in which is mounted an inlet valve assembly 25.

The inlet valve assembly 25 includes a valve seat element 26 having formed therein a passage surrounded by annular seat rib 27 which is engaged by a disc valve 28. The disc valve 28 is yieldingly pressed to the seated position by means of spring 29 which extends between the disc valve 28 and the spring cage 30, while the spring cage 30 is secured to the seat element 26 by means of screws 32, one of which is shown in the drawing.

A threaded member 34 is secured in a threaded opening in the cylinder head 4 and has a tubular portion 36 thereon which presses against the seat element 26 to maintain it in engagement with a shoulder 35 formed on the cylinder head 4, and thereby maintain the inlet valve assembly in position in the inlet chamber 22.

The tubular portion 36 on the threaded member 34 has a plurality of openings 38 therein to permit fluid under pressure to flow from the atmosphere through the passage 24 to the area within the tubular portion 36, and thence past the valve disc 28 to the compression chamber 5.

The threaded member 34 also has formed therein a central bore in which is mounted a plunger 40, while a coil spring 42 is mounted on the plunger 40 and extends between the head of the plunger 40 and a shoulder on the threaded member 34 and yieldingly presses the plunger 40 upwardly as viewed in the drawing.

The lower end of the plunger 40 confronts the disc valve 28, and is normally held out of engagement therewith by means of the spring 42.

The compressor has associated therewith a casing section 44 which is secured in the cylinder head 4 by suitable means, not shown, and which cooperates with the cylinder head to form a lever chamber 45 in which is mounted a lever 46 having one end extending into a narrow slot formed in the casing section 44. This end of the lever 46 is pivotally supported on the casing section 44 by means of a screw or pin 47, the end of which extends through an opening in the end of the lever 46, as is best shown in Fig. 2 of the drawing. The free end of the lever 46 extends over the head of the plunger 40 and has a threaded opening therein in which is mounted an adjusting screw 48, the end of which engages the head of the plunger 40.

The free end of the lever 46 has a slot 50 cut therein and extending to the edge of the lever from the threaded opening in which the adjusting screw 48 is mounted, as is best shown in Fig. 2 of the drawing. The free end of the lever 46 has a bore therein extending from the slot 50 to the face of the lever, while the portion of the lever opposite from this bore has a threaded opening therein adapted to receive a lock screw 52 mounted in the bore in the lever. The head of the lock screw 52 engages the face of the end of the lever 46 so that when the lock screw is tightened, the end of the lever 46 is clamped about the adjusting screw 48 to lock the screw 48 in the position to which it is adjusted.

The casing section 44 has a threaded opening therein opposite the free end of the lever 46, and this opening is closed by means of a threaded plug 53. When the plug 53 is removed, the lock screw 52 may be turned with a screw driver inserted through the opening in which the plug 53 is mounted.

The head 54 of the adjusting screw 48 has a plurality of notches 55 formed in the periphery thereof, as is best shown in Fig. 3 of the drawing, and these notches are adapted to receive the end of a screw driver inserted through the opening in which the plug 53 is mounted. These notches provide means by which the adjusting screw 48 may be turned or adjusted relative to the lever 46.

The casing section 44 has the relatively large bore therein in which is mounted a plunger 56 having a stem reciprocable in a smaller bore in the casing section 44, and engaging the lever 46 at a point intermediate the adjusting screw 48 and the pin 47 on which the lever 46 is pivotally supported.

The plunger 56 engages a face of a flexible metallic diaphragm 58 which is clamped between the casing section 44 and a cover section 59. The diaphragm 58 has at the other face thereof a chamber 60 which is connected by way of a pipe 61 with an unloading control device 62, which may be of any suitable well known construction, and which is responsive to one or more operating conditions of the compressor, such as the pressure of the fluid compressed by the compressor, the speed of the compressor, or operation of the compressor lubricating system, and controls the supply of fluid under pressure from the reservoir 10 by way of a pipe 63 to the pipe 61, and also controls the release of fluid under pressure from the pipe 61, and thereby from the chamber 60. One form of unloading means which I may employ is shown in U. S. Patent No. 2,065,204, issued to Burton S. Aikman, and assigned to the assignee of the present application.

The cover 59 has formed thereon a projection 65 which is adapted to engage the central portion of the diaphragm 58 to limit deflection of the diaphragm in one direction, while the plunger 56 is adapted to engage the surface indicated at 67 and formed on the casing section 44 to limit deflection of the diaphragm 58 in the other direction.

In operation, when the unloading control device is conditioned to connect the chamber 60 to the atmosphere, and thereby effect loading of the compressor, the spring 42 maintains the end of the plunger 40 away from the face of the valve disc 28 to permit the spring 29 to hold the valve disc 28 in engagement with the seat rib 27.

At this time the spring 42 operates through the plunger 40, the adjusting screw 48, and the lever 46 to move the plunger 56 and the diaphragm 58 upwardly until further upward movement of the diaphragm 58 is prevented by engagement of the diaphragm with the stop 65 formed on the cover section 59. On movement of the diaphragm 58 to this position, the head 54 of the adjusting screw 48 is moved adjacent to a face of the wall of the lever chamber 45, but the various parts of the apparatus are arranged and proportioned to permit the diaphragm 58 to be moved into engagement with the stop 65 before the head 54 of the adjusting screw 48 engages the wall of the lever chamber 45.

In addition, the various parts of the apparatus are adjusted so that when the diaphragm 58 is in engagement with the stop 65, the lower end of the plunger 40 will be disposed adjacent to but spaced from the valve disc 28 a short distance. If upon initial assembly of the apparatus this adjustment of the parts of the apparatus is not present, the adjusting screw 48 is turned relative to the lever 46 until the desired relationship of the plunger 40 and the valve disc 28 is secured, whereupon the lock screw 52 is tightened to secure the adjusting screw 48 in the position to which it is adjusted.

On the suction strokes of the piston 2 fluid under pressure is drawn into the compression chamber 5 from the atmosphere past the valve 28, which is moved away from the seat rib 27 against spring 29, while on the compression strokes of the piston 2, the valve 28 is moved to the seated position by the spring 29, while the fluid in the compression chamber 5 is compressed and moves the exhaust valve disc 15 away from the seat rib 14 against the spring 16 to permit fluid under pressure to flow to the exhaust chamber 7 and thence by way of the pipe 9 to the reservoir 10.

On subsequent operation of the unloading control device 62 to effect unloading of the compressor, this device operates to supply fluid under pressure from the reservoir 10 by way of the pipe 63 to the pipe 61 leading to the chamber 60, and upon an increase in the pressure of the fluid in the chamber 60, force is exerted upon the flexible diaphragm 58 and through the plunger 56 upon the lever 46. As the stem of the plunger 56 engages the lever 46 at a point substantially closer to the pin 47 than the adjusting screw 48, the free end of the lever 46, which carries the adjusting screw 48, will be moved a substantially greater distance than the plunger 56 is moved by deflection of the diaphragm 58. On this movement of the free end of the lever 46, and of the adjusting screw 48, the plunger 40 is moved downwardly against the spring 42 so that the end of the plunger 40 engages the valve disc 28 and moves it against the spring 29 away from the seat rib 27 on the seat element 26 to permit flow of fluid from the compression chamber 5 to the inlet chamber 22, and thence to the atmosphere by way of passage 24.

On continued reciprocation of the piston 2, fluid is drawn into the compression chamber 1 from the atmosphere past the open valve 28 on the suction or downward strokes of the piston, and on the compression or upward strokes of the piston, the fluid present in the compression chamber 5 flows past the open valve 28 to the inlet chamber 22 and thence to the atmosphere through the passage 24 with the result that the fluid in the compression chamber 5 is not compressed by the piston 2.

On the supply of fluid under pressure to the chamber 60, the diaphragm 58, the plunger 56, the lever 46, and the plunger 40 are moved downwardly until the valve disc 28 engages the spring cage 30 which prevents further movement of the valve disc and the associated apparatus. On movement of the valve disc 28 into engagement with the spring cage 30, and on the continued supply of fluid under pressure to the chamber 60, force is exerted by the diaphragm 58 on the valve disc 28 to press it against the spring cage 30.

It will be seen, however, that the plunger 56 engages the lever 46 much nearer the pin 47 than the adjusting screw 48 with the result that the lever ratio of the lever 46 is such that relatively little force is exerted on the valve disc 28, even though fluid at a relatively high pressure is present in the chamber 60. Accordingly, the valve disc 28 will not be bent or otherwise injured by force exerted thereon by the stem 40.

The various parts of the apparatus are arranged and proportioned so that the valve disc 28 will be moved into engagement with the spring cage 30 before the face of the plunger 56 has been moved into engagement with the surface 67 on the casing section 44. On movement of the valve disc 28 into engagement with the spring cage 30 further deflection of the diaphragm 58 is prevented, and the degree of deflection of the diaphragm 58 which is necessary to move the valve disc 28 into engagement with the spring cage 30 is relatively small and is such that it will not result in injury to the flexible diaphragm 58.

If for any reason however, such as improper adjustment of the adjusting screw 48, the valve disc 28 is not moved into engagement with the spring cage 30 before the plunger 56 engages the surface 67 on the casing section 44, engagement of the face of the plunger 56 with the surface 67 will prevent further downward movement of the diaphragm 58, and the extent of movement of the diaphragm 58 which can occur before the plunger 56 engages the surface 67 is such that injury to the diaphragm 58 will not result.

On the subsequent operation of the unloading control device 62 to effect loading of the compressor, this device operates to cut off the supply of fluid under pressure to the pipe 61, and to release fluid under pressure therefrom, and on the release of fluid under pressure from the pipe 61 there is a reduction in the pressure of the fluid in the chamber 60 at the face of the diaphragm 58. On this reduction in the pressure of the fluid in the chamber 60, the spring 42 moves the plunger 40 upwardly, as viewed in Fig. 1 of the drawing, away from the valve disc 28, thereby permitting the valve disc to be moved to the seated position by the spring 29. On continued operation of the compressor, fluid drawn into the compression chamber 5 during the suction strokes of the piston 2 will not be forced out of the compression chamber to the inlet chamber 22 on the compression strokes of the piston 2, but will be compressed and will flow past the valve disc 15 to the reservoir 10.

On this upward movement of the plunger 40, the lever 46 is pivoted about the pin 47, while the plunger 56 is moved upwardly, thereby moving the flexible diaphragm 58 into engagement with the stop 65 formed on the cover 59 which prevents further movement of the flexible diaphragm and of the associated mechanism.

It will be seen that the compressor construction provided by this invention includes unloading means actuated by a flexible diaphragm for maintaining the inlet valve of the compressor unseated, and that means is interposed between the flexible diaphragm and the inlet valve to multiply the extent of travel of the diaphragm to thereby insure that the inlet valve will be moved away from its seat, and will be held a substantial distance away from its seat to permit free flow of fluid from the compression chamber of the compressor past the inlet valve and thus effectively unload the compressor.

In addition, it will be seen that the compressor construction provided by this invention includes adjustable means interposed between the flexible diaphragm and the inlet valve disc to enable the mechanism to be adjusted to compensate for the manufacturing variations necessarily present in the construction of the apparatus of this character, and to thereby insure that movement of the diaphragm will unseat the inlet valve, and to also insure that on the release of fluid under pressure from the chamber at the face of the flexible diaphragm that the inlet valve can be moved to the seated position to load the compressor.

Furthermore it will be seen that the apparatus associated with the unloading mechanism is entirely enclosed and protected so that the compressor presents an attractive appearance, and so that the unloading mechanism will not be injured or rendered inoperative. While the unloading mechanism is entirely enclosed, the apparatus is arranged so that the unloading mechanism is readily accessible for adjustment if such is required.

In order to vary the adjustment of the unloading mechanism, the threaded plug 53 is removed, thereby exposing the lock screw 52 and the head 54 of the adjusting screw 48. The lock screw 52 may be loosened by means of a screw driver inserted through the opening in which the threader plug 53 is mounted, and after the lock screw 52 is loosened, the screw driver which was employed to turn the lock screw 52 may be inserted in one of the notches 55 in the head 54 of the adjusting screw 48 to turn the adjusting screw relative to the lever 46, and thereby secure the proper adjustment of this screw. After the adjusting screw 48 has been turned to the proper position, the lock screw 52 is tightened to maintain the adjusting screw 48 in the position to which it has been adjusted and the threaded plug 53 is thereupon replaced.

In addition it will be seen that the mechanism provided by this invention is arranged so that the flexible diaphragm 58 may be quickly and easily replaced if required. In order to replace the diaphragm it is only necessary to remove the cover 59 and install a new diaphragm. It is unnecessary to remove or detach other portions of the unloading mechanism or to vary the adjustment thereof.

While one embodiment of the improved compressor construction provided by this invention has been illustrated and described in detail, it is to be understood that the invention is not limited to these details of construction, and that numerous changes and modifications may be made without departing from the scope of the following claim.

Having now described my invention, what I claim as new and desire to secure by Letters Patent, is:

In a fluid compressor, in combination, a body having a cylinder bore therein providing a compression chamber, an inlet valve associated with said body and engageable with a seat surrounding a passage through which fluid may flow to and from said compression chamber, a spring for pressing said inlet valve against said seat, the body having a bore therein, a plunger mounted in said bore with one end thereof confronting said inlet valve, a spring yieldingly pressing said plunger away from said inlet valve, said body having a lever chamber formed therein, a lever mounted in said lever chamber and pivotally supported adjacent one end on said body, an adjusting screw carried by the free end of said lever and engageable with the end of said plunger, a flexible diaphragm associated with said body and having at one face a follower operatively connected with said lever at a point intermediate said adjusting screw and the point of connection of the lever with the body, the diaphragm having at the other face thereof a pressure chamber adapted to contain fluid under pressure, a wall of said lever chamber having an opening therein adjacent the free end of said lever, a closure for said opening, and means carried by said lever and accessible through said opening for locking said adjusting screw relative to said lever, said adjusting screw having a head thereon having a plurality of notches formed in the periphery thereof and adapted to receive the end of a tool inserted through the opening in said wall, whereby said screw may be turned relative to said lever.

GEORGE K. NEWELL.